Dec. 25, 1951     G. H. GLOSS     2,580,168
METHOD OF MANUFACTURE OF ANHYDROUS
MAGNESIUM CARBONATE
Filed Aug. 19, 1946
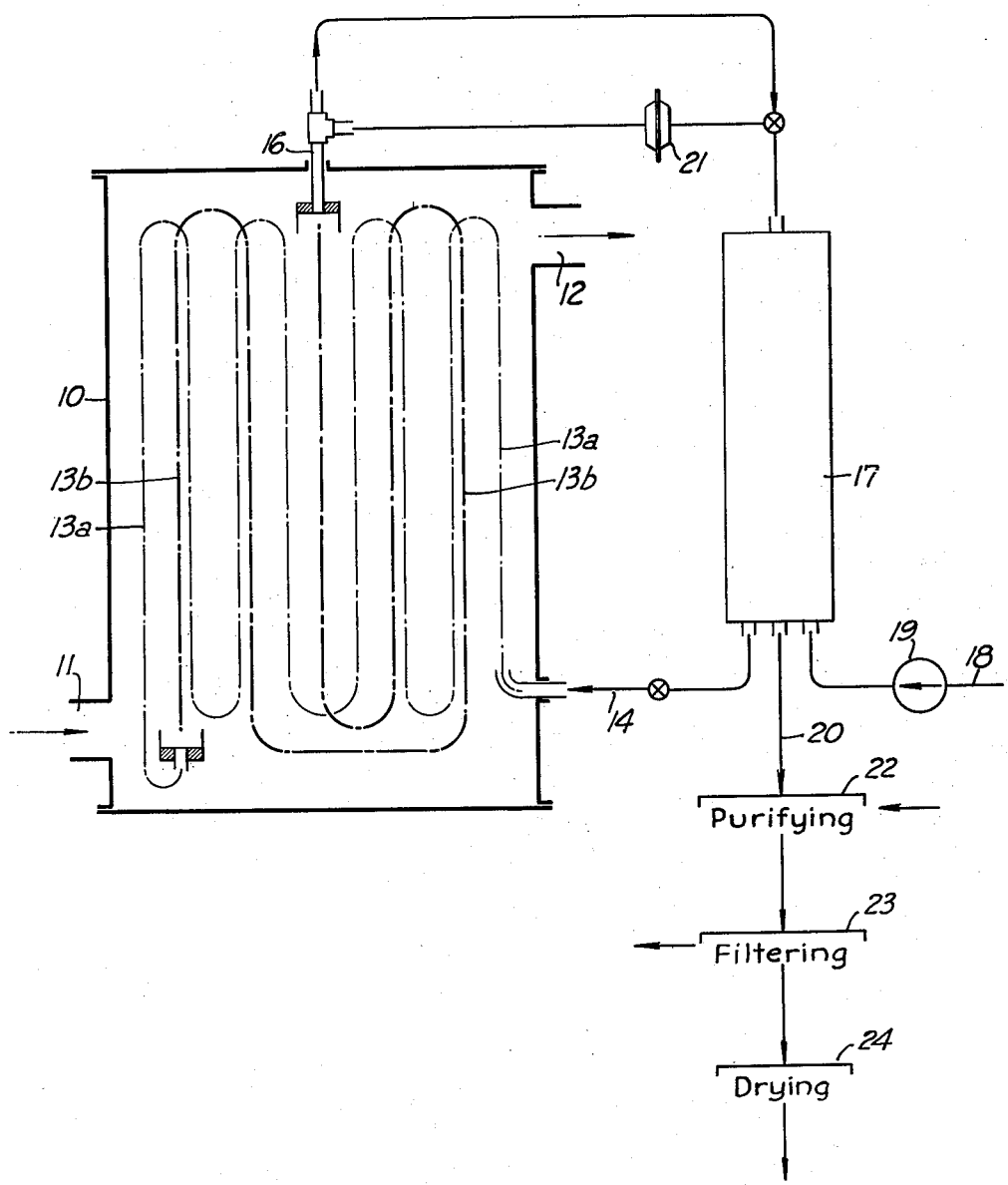
INVENTOR.
Gunter H. Gloss
BY
ATTORNEY Patented Dec. 25, 1951

2,580,168

UNITED STATES PATENT OFFICE 2,580,168

METHOD OF MANUFACTURE OF ANHYDROUS MAGNESIUM CARBONATE

Gunter H. Gloss, Redwood City, Calif., assignor to Merck & Co., Inc., Rahway, N. J., a corporation of New Jersey Application August 19, 1946, Serial No. 691,584

2 Claims. (Cl. 23—67)

This invention relates generally to anhydrous magnesium carbonate, or what is commonly referred to as synthetic magnesite, and to methods and apparatus for the manufacture of such material.

It has been known in the past that anhydrous magnesium carbonate $MgCO_3$ can be prepared from other hydrated and basic forms of magnesium carbonates by heating under pressure. However, these methods have required the batch treatment of materials at elevated temperatures and under considerable pressure, and have not been adapted to large scale low cost production. Synthetic magnesite possesses various advantages over naturally occurring magnesite, particularly in that the purity of the product can be controlled according to the character of the material supplied to the process and in that the artificial product consists of very small individual crystals of uniform size.

It is an object of the present invention to provide a new method and apparatus for the manufacture of synthetic magnesite which will enable large scale production at relatively low cost.

A further object of the invention is to provide a method capable of producing a high quality synthetic magnesite having unusual physical and chemical properties.

Further objects of the invention will appear from the following description in which the preferred embodiment of the invention has been set forth in detail in conjunction with the accompanying drawing.

My method involves generally the establishment of a series of treatment zones to which an anhydrous slurry of the material to be treated is supplied, and from which a slurry of anhydrous magnesium carbonate is finally discharged. The material being supplied is magnesium carbonate, having combined water or water of crystallization, such as neutral carbonate ($MgCO_3 \cdot 3H_2O$) or basic carbonate. Within the first treatment zone the slurry is heated under pressure to an elevated temperature, and in the second or main reaction zone the material is maintained under pressure at an elevated temperature for a period of time sufficient to convert the material to anhydrous magnesium carbonate. Following discharge from the main reaction zone the material may be further purified as will be presently explained.

The equipment illustrated in the drawing is satisfactory for carrying out the method. It consists of a heating jacket or shell 10 having inlet and outlet connections 11 and 12 and which is preferably heat insulated. Suitable hot gas is continuously introduced through conduit 11, as for example hot flue gas, or heated air. Within the jacket 10 are the two serially connected clusters or sets of flow conduits 13a and 13b. It is desirable that the conduit 13a be relatively small in diameter compared to conduit 13b, for a purpose to be presently explained. Line 14 connects with the inlet end of tube 13a, and it is through this connection that the hydrous slurry is introduced. The completely converted slurry is removed from the discharge end of the conduit 13b, through pipe connection 16. All piping and conduits are of suitable corrosion resistant material such as Monel metal.

It is desirable to preheat the inflowing slurry and to utilize for this purpose some of the heat of the discharging material. Therefore, the discharge line 16 is shown connected to a heat exchanger 17, which may be of any suitable conventional type. Line 18 represents incoming hydrous slurry to be treated, which is supplied to the heat exchanger by pressure pump 19, after which it flows from the exchanger through line 14 to the conduit 13a. The discharging slurry is shown being removed from the exchanger by way of line 20 for further treatment as will be presently described. It will be evident that in commercial installations the conduits 13a and 13b can be arranged in clusters in any convenient fashion about the central vertical axis of the jacket 10, which can in turn be of cylindrical form. A desired pressure is maintained in conduits 13a, 13b by a suitable back pressure regulator 21 of conventional construction, which is connected in the discharge line 16.

Operation of the apparatus described above, and the carrying out of my method, is as follows: Pump 19 supplies a continuous stream of slurry to the inlet end of conduit 13a. Good results have been secured by using a slurry of neutral magnesium carbonate ($MgCO_3 \cdot 3H_2O$) together with a catalyst such as sodium carbonate or preferably sodium bicarbonate. The solids content of the slurry can, by way of example, be of the order of 5 to 15%, and the amount of sodium bicarbonate added can be of the order of 1 to 5%. A slurry which is too concentrated in solids content is objectionable in that immediate conversion of the neutral magnesium carbonate to basic magnesium carbonate, as will be presently described, may be occasioned by clogging of the conduit 13a. Regulator 21 is set to maintain a constant back pressure which in a typical instance may be of the order of 300 to 750 p. s. i. for treatment temperatures in conduit 13b of the order of 400 to 500° F. In passing through the heat exchanger 17 the temperature of the incoming material is elevated, while at the same time the temperature of the discharging material is lowered. In a typical instance, the incoming material supplied by way of line 18 may be of the temperature of the order of 65° F., and upon leaving the exchanger 17 may be of the order of 150° F.

Upon commencing its flow through the conduit 13a the slurry receives heat from the surrounding hot gases, and as a result its temperature is raised. Some time before the slurry reaches the inlet end of conduit 13b, it has been raised to a temperature of the order of 200° F., whereby the material may progressively expand to form an intermediate form of basic magnesium carbonate, or a neutral monohydrate $MgCO_3.H_2O$. This conversion phase has been substantially completed when the material reaches the inlet end of the conduit 13a. The temperature of the material at this time is sufficient, for the pressures involved, and the time period of retention, to cause the reaction which changes the hydrated or basic magnesium carbonate to anhydrous magnesium carbonate ($MgCO_3$). In a typical instance where the inlet end of conduit 13b is at a pressure of the order of 300 p. s. i., the temperature of the material delivered from pipe 13a can be of the order of 400 to 450° F. and the time period of retention to complete the reaction can be of the order of 30 to 90 minutes.

The sodium bicarbonate plays an important part in the final reaction. It supplies a desirable excess of $CO_2$ on heating and in addition, the sodium ion seems to catalyze the conversion. In general it enables the conversion to take place within reasonable limits of time, temperature and pressure. Sodium carbonate can be used for this purpose but is not as effective.

As the discharged material passes through the heat exchanger 17, and assuming that at the point of discharge it is at a temperature of the order of 400° F., its temperature in a typical instance will be reduced in the heat exchanger to a value of the order of 200° F.

In effect, the conduits 13a and 13b form two treatment zones through which the material continuously flows. Within the first treatment zone formed by conduit 13a there is a continual rise in treatment temperature and beginning conversion of the hydrated magnesium carbonate. Although this conversion may cause a decided thickening of the slurry, the solids content of the initial slurry and the rate of flow is such that after conversion the slurry will continue to flow without causing clogging. For the values previously stated by way of example the time period of retention in the conduit 13a may be of the order of 2 to 5 minutes, the flow rate through conduits 13a and 13b can be of the order of 150 feet per minute and 10 feet per minute respectively.

In the equipment as diagrammatically illustrated, conduit 13a is considerably smaller in diameter than conduit 13b. The purpose of this is to facilitate heat transfer, and to prevent clogging while the neutral magnesium carbonate goes through an intermediate thickening stage. The larger diameter for the conduit 13b enables a proper time period of retention at slower flow rates, which is desirable in that it enables substantially complete conversion to anhydrous magnesium carbonate.

In many instances, it is desirable to produce a relatively pure form of anhydrous magnesium carbonate which is relatively free of unconverted or incompletely converted material. Thus the material being removed from the process at 20 is shown being subjected to a purifying step 22 for the purpose of removing unconverted or incompletely converted magnesium carbonate. This step can be carried out by washing the material in a mild acid capable of dissolving the unconverted or incompletely converted material. A simple and desirable procedure is to subject the slurry at this point to carbonation by introducing carbon dioxide or flue gas into the material. Carbonic acid dissolves all of the carbonate other than the completely converted material, whereby the completely converted material can then be removed from the effluent by filtration 23. The filter cake is then dried at 24 by conventional methods.

As a source of neutral magnesium carbonate for use in the process described above it has been found desirable to utilize material produced by the process of my Patent 2,390,095. This is a neutral magnesium carbonate in tri-hydrate form produced by precipitation from a magnesium bicarbonate solution, by the use of aeration. When utilizing such source of material, it has been found that the final product (dry form) has a relatively small particle size of the order of from 3 to 6 microns and a bulk density of from 40 to 50 lbs. per cubic foot. A suspension of this material in water has a pH of 8.3. It is highly inert chemically and is resistant to the action of dilute acids and alkalis. The particles are individual crystals of $MgCO_3$, belonging to the hexagonal system, with a refractive index of 1.700–1.509 and a hardness of about 4.0 to 4.5 (Moh's scale). Due to the size and physical character of the particles, which are small, individual, uniformly sized crystals, and the hardness afforded, the product has been found to be an excellent polishing and cleansing agent.

In place of utilizing neutral magnesium carbonate obtained from the process of my Patent 2,390,095, I have utilized a relatively small particle size magnesium hydroxide converted by carbonation to form neutral magnesium carbonate. For example, precipitated magnesium hydroxide can be used such as is produced by the process of Patent 2,089,339. Such a material has the bulk of its particles less than 3 microns in diameter. When utilizing such a source of neutral magnesium carbonate, it has been found that the particle size of the final product is somewhat smaller, being of the order of from 1 to 3 microns with a bulk density of from 20 to 30 lbs. per cubic foot.

In place of the sources of neutral magnesium carbonate referred to above, it is evident that various types of materials can be used for preparing the neutral magnesium carbonate. However, the character of the source will affect the particle size of the final material.

In place of using a slurry of neutral magnesium carbonate, it is possible to use a slurry of basic magnesium carbonate together with sodium bicarbonate. However, use of neutral magnesium carbonate is deemed advisable because it enables carrying out expansion and conversion to anhydrous magnesium carbonate as one continuous operation.

I claim:

1. In a method for the manufacture of anhydrous magnesium carbonate, the steps of continuously feeding a hydrous slurry of neutral magnesium carbonate into a reaction zone together with a material selected from the group comprising sodium carbonate and sodium bicarbonate, heating the material in said zone to a temperature of the order of 200° F. to convert the neutral carbonate to basic magnesium carbonate, subsequently continuously supplying the resulting slurry to a second treatment zone, heating the material in said second treatment zone to a temperature of the order of 400 to 500 F., and maintaining pressures in said zones of the order of from 300 to 750 p. s. i., the treatment in the second zone serving to convert the basic magnesium carbonate to anhydrous magnesium carbonate, and continuously removing a slurry containing said anhydrous magnesium carbonate from the second zone.

2. In a method for the manufacture of anhydrous magnesium carbonate, the steps of continuously feeding a hydrous slurry of neutral magnesium carbonate to a reaction zone together with a material selected from the group comprising sodium carbonate and sodium bicarbonate, heating the material in said zone to a temperature of the order of 200 F. with continual flow of the material through said zone to convert the neutral carbonate to basic magnesium carbonate, continuously removing the resulting slurry from the first zone and continuously supplying the same to a second treatment zone, heating the material in said second treatment zone to a temperature of the order of 400 to 500° F. with continuous flow of the material through said second zone, continuously discharging slurry from the second zone, controlling said discharge from the second zone to maintain a back pressure in said zones of the order of from 300 to 750 p. s. i., treatment in said second zone serving to convert the basic magnesium carbonates to anhydrous magnesium carbonate whereby the anhydrous magnesium carbonate slurry is continuously discharged from said second zone, and causing the rate of flow of material through the first zone to be relatively rapid compared to the rate of flow through the second zone.

GUNTER H. GLOSS.

REFERENCES CITED

The following references are of record in the file of this patent:

UNITED STATES PATENTS

| Number | Name | Date |
|---|---|---|
| 2,131,524 | Schulze | Sept. 27, 1938 |

FOREIGN PATENTS

| Number | Country | Date |
|---|---|---|
| 545,071 | Germany | Feb. 25, 1932 |

OTHER REFERENCES

Mellor: "Comprehensive Treatise on Inorganic and Theoretical Chemistry," vol. IV, pages 351–352.